US012796650B2

(12) United States Patent
Wu et al.

(10) Patent No.: US 12,796,650 B2
(45) Date of Patent: Nov. 17, 2026

(54) PET LITTER SCOOP ASSEMBLY AND LITTER SIEVE

(71) Applicants: JINHUA JIU MIAO ENTERPRISE MANAGEMENT CO., LTD., Jinhua (CN); JINHUA UNIVERSITY OF VOCATIONAL TECHNOLOGY, Jinhua (CN)

(72) Inventors: Xia Wu, Jinhua (CN); Zhiyu Tang, Jinhua (CN); Yifan Ge, Jinhua (CN)

(73) Assignees: JINHUA JIU MIAO ENTERPRISE MANAGEMENT CO., LTD., Jinhua (CN); JINHUA UNIVERSITY OF VOCATIONAL TECHNOLOGY, Jinhua (CN)

( * ) Notice: Subject to any disclaimer, the term of this patent is extended or adjusted under 35 U.S.C. 154(b) by 976 days.

(21) Appl. No.: 17/970,655

(22) Filed: Oct. 21, 2022

(65) Prior Publication Data

US 2024/0130325 A1 Apr. 25, 2024
US 2024/0224928 A9 Jul. 11, 2024

(51) Int. Cl.
*A01K 1/01* (2006.01)
*E01H 1/12* (2006.01)

(52) U.S. Cl.
CPC ............ *A01K 1/01* (2013.01); *E01H 1/1206* (2013.01)

(58) Field of Classification Search
CPC ............ A01K 1/01; E01H 1/12; E01H 1/1206
USPC .......................................................... 294/1.3
See application file for complete search history.

(56) References Cited

U.S. PATENT DOCUMENTS

| | | | | |
|---|---|---|---|---|
| D347,497 | S * | 5/1994 | VanSkiver | 294/1.3 |
| 6,022,058 | A * | 2/2000 | O'Rourke | B07B 1/02 294/1.3 |
| 6,312,029 | B1 * | 11/2001 | Renforth | A01K 1/0114 294/1.3 |
| 6,578,807 | B1 * | 6/2003 | Lipscomb | A01K 1/0114 248/314 |
| D508,760 | S * | 8/2005 | Berti | D32/74 |
| D659,916 | S * | 5/2012 | Myerson | D30/162 |
| D679,876 | S * | 4/2013 | Teren | D30/162 |
| D833,090 | S * | 11/2018 | Leick | D30/162 |
| D955,071 | S * | 6/2022 | Wilhelm | D30/162 |
| D1,067,553 | S * | 3/2025 | Lai | D30/162 |
| 2004/0227364 | A1 * | 11/2004 | Pain | A01K 1/0114 294/1.3 |
| 2005/0173935 | A1 * | 8/2005 | Pain | A01K 1/0114 294/1.3 |
| 2006/0156991 | A1 * | 7/2006 | Burns | A01K 1/0114 119/161 |

(Continued)

*Primary Examiner* — Paul T Chin

(57) ABSTRACT

A pet litter scoop assembly and a litter sieve are related, the pet litter scoop assembly including the litter sieve for collecting used litter. The litter sieve includes a base part and a handle extending from the base part, the base part including a bottom wall and a sidewall extending upwardly from the bottom wall, with a sieving cavity formed by the sidewall and the bottom wall, the handle connected to the sidewall. The litter sieve includes holes penetrating the bottom wall and sized such that the used litter cannot pass through the holes, and at least one guiding rib(s) protruding from the bottom wall to the sieving cavity and positioned adjacent to the holes to guide unused litter pellets in the sieving cavity to pass through the holes. The litter sieve and litter scoop assembly can help to avoid blocking of the holes.

19 Claims, 4 Drawing Sheets

(56) References Cited

U.S. PATENT DOCUMENTS

2007/0277741 A1* 12/2007 Delman ............... A01K 1/0114
119/166
2009/0058115 A1* 3/2009 Freedman ............. A01K 1/011
294/177

* cited by examiner

PET LITTER SCOOP ASSEMBLY AND LITTER SIEVE

TECHNICAL FIELD

The present disclosure relates to a technical field of pet supplies, particularly to a litter sieve and a pet litter scoop assembly for separating unused litter pellets from used litter.

BACKGROUND

Raising a house pet is a new fashion, ever since humans domesticated dogs and cats and welcomed them to become a family member. However, disposing of pet wastes has also been a problem.

A litter box is commonly used in dealing with pet wastes. After waste excretion of the pets, the waste sticks to or soils litter particles in the litter box to form soiled waste block so as to get cleaned up before piled up too much. In separating the soiled waste block from the unused litter pellets, a litter scoop is commonly used. However, holes of a scoop in a related art may get easily stuck by the unused litter pellets, especially when the unused litter pellets are strip-shaped tofu litter. Besides, the litter scoop in related arts does not involve a convenient storage and an easy portability.

A new litter scoop with modified structures is needed.

SUMMARY

In one aspect, one objective of the present disclosure is to provide such a pet litter scoop assembly, including a litter sieve for collecting used litter, wherein, the litter sieve includes a base part and a handle extending from the base part, the base part comprising a bottom wall and a sidewall extending upwardly from the bottom wall, with a sieving cavity formed by the sidewall and the bottom wall, the handle connected to the sidewall, wherein, the litter sieve includes holes penetrating the bottom wall and sized such that the used litter cannot pass through the holes, and at least one guiding rib(s) protruding from the bottom wall to the sieving cavity and positioned adjacent to the holes to guide unused litter pellets in the sieving cavity to pass through the holes.

In one embodiment, the sidewall is U-shaped or V-shaped, with a notch communicating with the sieving cavity and formed by the sidewall.

In one embodiment, an array of the holes are configured on the bottom wall and the guiding rib is at least configured between two adjacent holes.

In one embodiment, an array of the guiding ribs are configured on the bottom wall, with at least one of the holes provided between two adjacent guiding ribs.

In one embodiment, the holes are elongated-shaped and the guiding ribs extends along a longitude direction of the holes.

In one embodiment, a row of holes are configured between two adjacent guiding ribs, the guiding rib having a length equal to or longer than a row length of the holes.

In one embodiment, the holes adjacent to the sidewall further extend to and penetrate the sidewall.

In one embodiment, the sidewall includes a backwall connecting to the bottom wall and the handle, and two wing walls separated by and connected to the backwall.

In one embodiment, the wing walls have a height decreasing in a direction away from the backwall.

In one embodiment, the handle includes a through hole at a distal end away from the sidewall.

In one embodiment, the pet litter scoop assembly further includes a scoop detachably connected to the litter sieve, including: a main body configured to receive the base part; and a hand sleeve part extending from the main body and configured to receive the handle.

In one embodiment, the main body includes a lower wall corresponding to and spaced apart from the bottom wall, and a surrounding wall extending upwardly from the lower wall and corresponding to the sidewall, with a receiving space formed by the surrounding wall and the lower wall to receive the base part.

In one embodiment, a distance between the lower wall and the bottom wall increases in a direction away from the handle.

In one embodiment, the hand sleeve part has a U-shaped groove to receive the handle.

In one embodiment, the hand sleeve part includes at least one protrusion formed in the U-shaped groove to abut against the handle when the litter sieve is assembled with the scoop.

In a further aspect, the present disclosure further provides litter sieve for collecting used litter, including a base part and a handle extending from the base part, the base part including a bottom wall and a sidewall extending upwardly from the bottom wall, with a sieving cavity formed by the sidewall and the bottom wall, the handle connected to the sidewall, wherein, the litter sieve includes holes penetrating the bottom wall and sized such that the used litter cannot pass through the holes, and at least one guiding rib(s) protruding from the bottom wall to the sieving cavity and positioned adjacent to the holes to guide unused litter pellets in the sieving cavity to pass through the holes.

In one embodiment, an array of the holes are configured on the bottom wall and the guiding rib is at least configured between two adjacent holes.

In one embodiment, an array of the guiding ribs are configured on the bottom wall, with at least one of the holes provided between two adjacent guiding ribs.

In one embodiment, the holes are elongated-shaped and the guiding ribs extends along a longitude direction of the holes.

In one embodiment, a row of holes are configured between two adjacent guiding ribs, the guiding rib having a length equal to or longer than a row length of the holes.

In one embodiment, the holes adjacent to the sidewall further extend to and penetrate the sidewall.

According to the present disclosure, the guiding ribs of the bottom wall in the litter sieve may help to guide the unused litter pellets to smoothly pass through the holes. Besides, the assembling between the litter sieve and the scoop can facilitate the storage of the whole pet litter scoop assembly, and also help to save the space.

BRIEF DESCRIPTION OF DRAWINGS

In order to more clearly illustrate the technical solutions in the embodiments of the present disclosure, the following will briefly describe the accompanying drawings used in the description of the embodiments. Obviously, the accompanying drawings in the following description are only some embodiments of the present disclosure. For a person of ordinary skill in the art, other drawings may be obtained from these drawings without creative work.

DETAILED DESCRIPTION OF EMBODIMENTS

Figure 1:
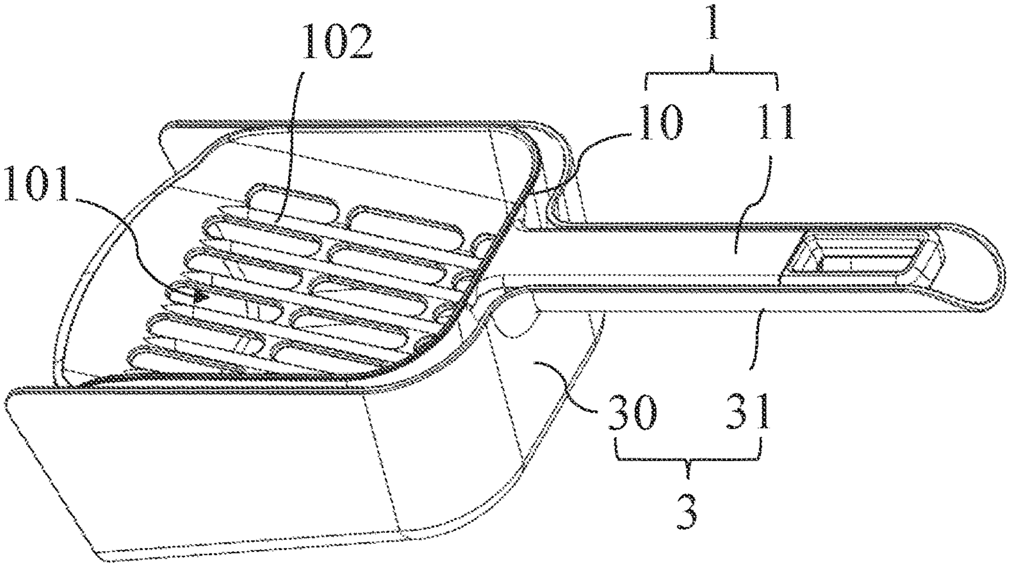
FIG. 1 is a schematic diagram of a general structure of a pet litter scoop assembly according to an embodiment of the present disclosure.

To make the objectives, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiments are described below.

As shown in FIGS. 1-4, a pet litter scoop assembly according to embodiments of the present disclosure is provided.

The pet litter scoop assembly including a litter sieve 1 for collecting used litter 21. The litter sieve 1 includes a base part 10 and a handle 11 extending from the base part 10, the base part comprising a bottom wall 10*a* and a sidewall 10*a*' extending upwardly from the bottom wall 10*a*, with a sieving cavity 100 formed by the sidewall 10*a*' and the bottom wall 10*a*, the handle 11 connected to sidewall. The sidewall 10' includes two wing walls 10*c* connected with each other directly or indirectly, with a notch 103 formed between the two wing walls 10*c*, so as to receive pet litter from a litter box. The notch 103 communicates with the sieving cavity 100. For example, the side wall may be V-shaped or U shaped. In this embodiment, in order to get a large volume, the sidewall 10*a*' is U-shaped, and further includes a backwall 10*b* connected between the two wing walls 10*c*, with the notch 103 and the backwall 10*b* configured at two opposite sides of the wing walls. Herein, the litter sieve 1 includes holes 101 penetrating the bottom wall 10*a* and sized such that the used litter 21 cannot pass through the holes 10*a*, and at least one guiding rib(s) 102 protruding from the bottom wall 10*a* to the sieving cavity 100 and positioned adjacent to the holes 101 to guide unused litter pellets 20 in the sieving cavity 100 to pass through the holes 101.

Figure 3:
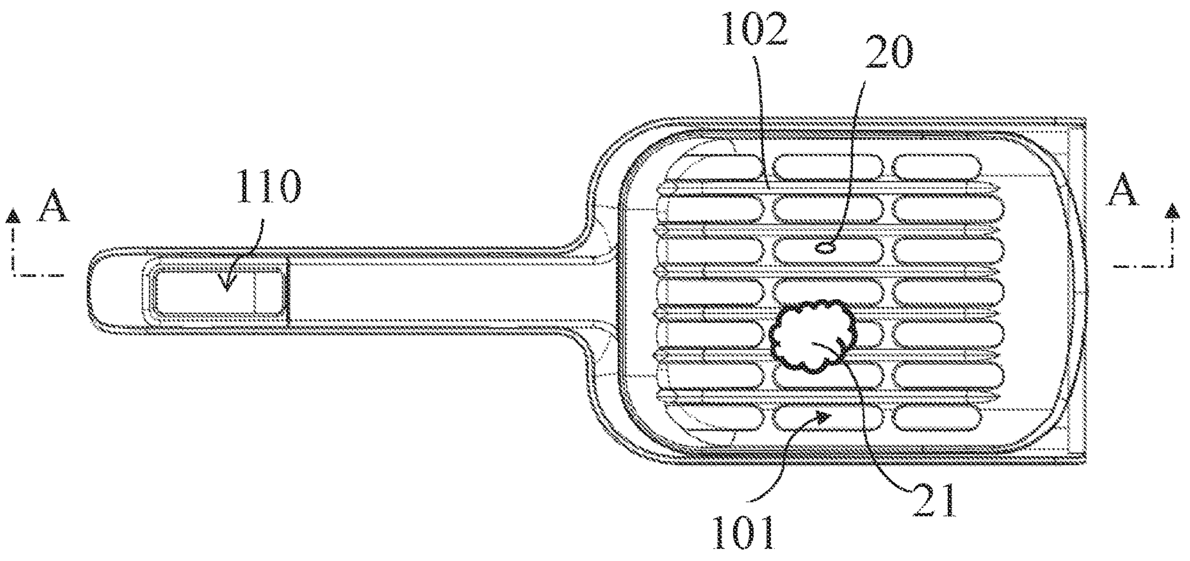
FIG. 3 is a top view of an embodiment of the pet litter scoop assembly in FIG. 1.

As shown in FIG. 3, an array of the holes 101 are formed on the bottom wall 10*a* and the guiding rib 101 is at least configured between two adjacent holes 101. The guiding ribs 102 are configured in an array on the bottom wall 10*a*, with at least one of the holes 101 provided between two adjacent guiding ribs 102. The holes 101 are elongated-shaped and the guiding ribs 102 extends along a longitude direction of the holes 101.

Further, the holes 101 are contributed in rows, with a row of holes 101 configured between two adjacent guiding ribs 102, and the guiding rib 102 having a length equal to or less than a row length of the holes 102. As shown in FIG. 3, each guiding rib 102 extends from the beginning of the row to the end of the row, and it can be known to one skilled in the art that, the rib may also can be separately configured to be in a length corresponding to an adjacent hole, that is, separate ribs are also configured in a row parallel to the row of holes. With the guiding ribs 102 extending along the longitude direction, unused litter pellets, especially strip-shaped tofu litter, can keep parallel to the guiding ribs 102 when users shake the litter sieve 1, and then easily pass through the holes 101, thus raising leakage efficiency of unused litter pellets.

Figure 5:
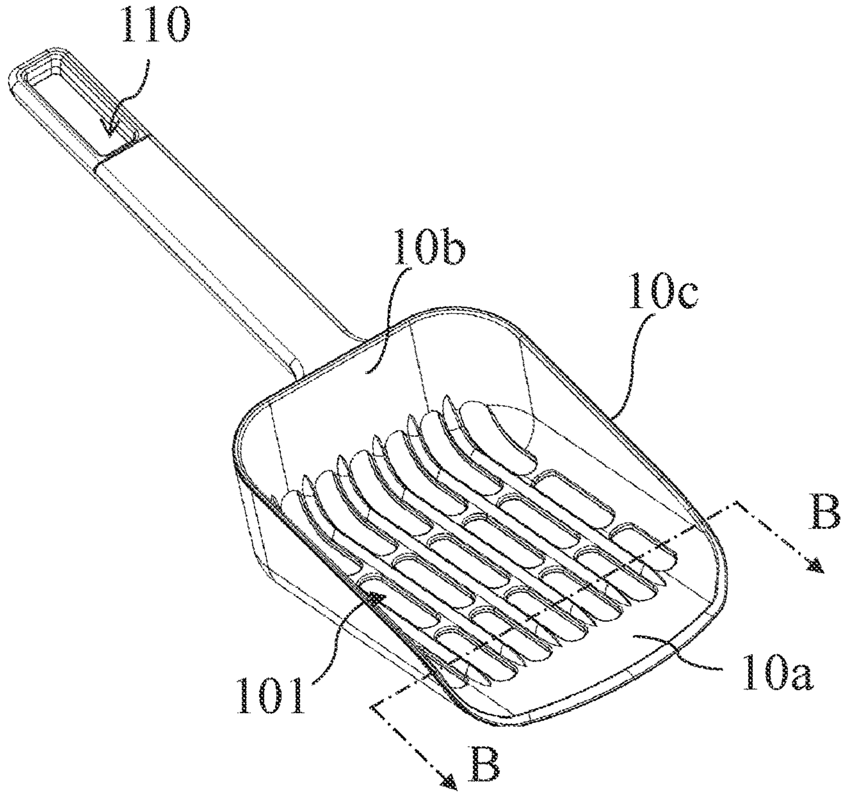
FIG. 5 illustrates an embodiment of a litter sieve of the present disclosure.
Figure 6:
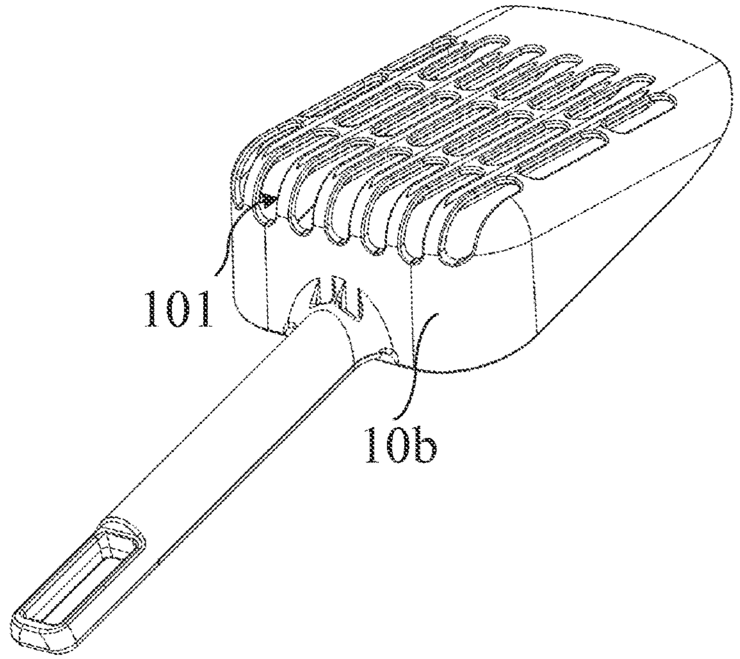
FIG. 6 illustrates another view of the litter sieve in FIG. 5.

As shown in FIGS. 5-6, the holes 101 adjacent to the U-shaped sidewall 10*a*' further extend to and penetrate the U-shaped sidewall 10*a*', so that more unused litter pellets 20 can pass through the holes 101.

Figure 2:
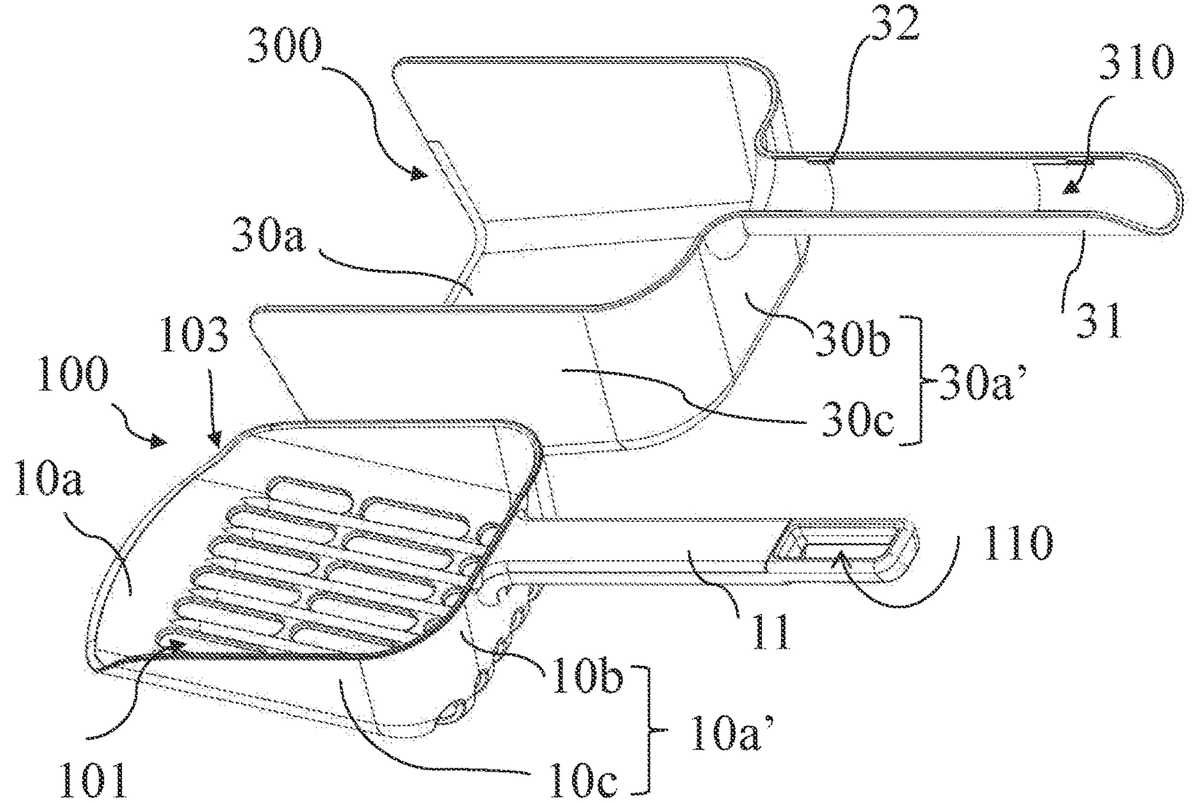
FIG. 2 is an exploded view of an embodiment of the pet litter scoop assembly in FIG. 1.

In a further embodiment, as shown in FIG. 2, the wing walls 10*c* have a height decreasing in a direction away from the backwall 10*b*, to get an enlarged notch 103 for collecting pet litter from the litter box.

As shown in FIGS. 1-2, the handle 11 includes a through hole 110 at a distal end away from the sidewall 10*a*'. The pet litter scoop assembly or litter sieve 1 can be hung up through the through hole 110.

As shown in FIGS. 1-4, the pet litter scoop assembly further includes a scoop 3 detachably connected to the litter sieve 1. The scoop 3 includes a main body 30 configured to receive the base part 10; and a hand sleeve part 31 extending from the main body 30 and configured to receive the handle 11. The main body 30 includes a lower wall 30*a* corresponding to and spaced apart from the bottom wall 10*a*, and a surrounding wall 30*a*' extending upwardly from the lower wall 30*a* and corresponding to the sidewall 10*a*', with a receiving space 300 formed by the surrounding wall 30*a*' and the lower wall 30*a* to receive the base part 10. Similarly with the sidewall 10*a*', the surrounding wall 30*a*' may also be V-shaped or U shaped.

Figure 4:
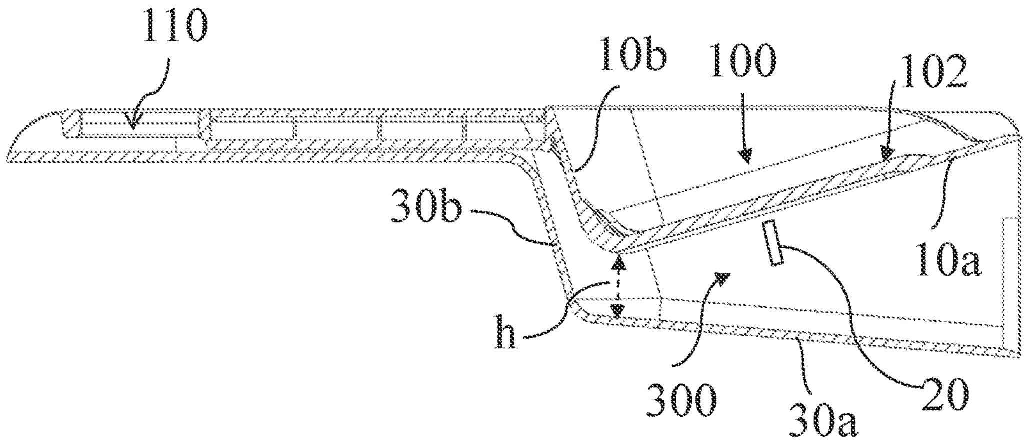
FIG. 4 is a sectional view of the pet litter scoop assembly along A-A line in FIG. 3.

As shown in FIG. 4, a distance h between the lower wall 30*a* and the bottom wall 30*a* increases in a direction away from the handle 11. When the litter sieve 1 is assembled with the scoop 3, the unused litter pellets 20 can may run through the holes 101 and get collected in the space between the lower wall 30*a* and the bottom wall 30*a* and further to be put back into the litter box.

In one embodiment, as shown in FIGS. 2-3 the hand sleeve part 31 has a U-shaped groove 310 to receive the handle 11. Further, the hand sleeve part 31 may include at least one protrusion 32 formed in the U-shaped groove 310 to abut against the handle 11 when the litter sieve 1 is assembled with the scoop 3. With the assembling between the litter sieve 1 and the scoop 3, the storage of the whole pet litter scoop assembly may be convenient, and the pet litter scoop assembly can occupy less space.

Figure 7:
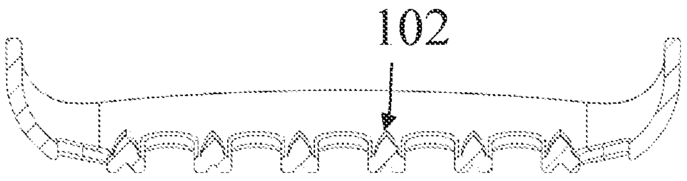
FIG. 7 is a sectional view of the litter sieve along B-B line in FIG. 5.

As shown in FIG. 5-7, in a further embalmment, the present disclosure further provides litter sieve 1 for collecting used litter, the litter sieve 1 has a structure similar with the litter sieve in the abovementioned pet litter scoop assembly, and details are not described, to avoid repetition.

Specifically, as shown in FIGS. 5-6, at least one of the backwall 10*b* and the wing walls 10*c* may smoothly connected to the bottom wall 10*a*, and the hole 101 adjacent thereto further extend to and penetrate the backwall 10*b* and/or the wing walls 10*c*.

In the description of the present disclosure, it should be understood that, terms such as “first” and “second” are used herein for purposes of description and are not intended to indicate or imply relative importance or significance or to imply the number of indicated technical features. Thus, the feature defined with “first” and “second” may comprise one or more of the features. In the description of the present disclosure, the term "a plurality of" means two or more than two, unless specified otherwise.

In the present disclosure, unless specified or limited otherwise, the terms "mounted", "connected", "coupled", "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on", "above", or "on top of" a second feature may include an embodiment in which the first feature is right or obliquely "on", "above", or "on top of" the second feature, or just means that the first feature is at a height higher than that of the second feature; while a first feature "below", "under", or "on bottom of" a second feature may include an embodiment in which the first feature is right or obliquely "below", "under" or "on bottom of" the second feature, or just means that the first feature is at a height lower than that of the second feature.

In the description of the present specification, the terms "an embodiment", "some embodiments", "an example", "a specific example", "some examples" or the like mean that a particular feature, structure, material, or characteristic described in connection with the embodiment or example is included in at least one embodiment or example of the present disclosure. In the specification, the appearances of the above-mentioned terms are not necessarily referring to the same embodiment or example. Furthermore, the particular features, structures, materials, or characteristics described can be combined in any suitable manner in one or more embodiments or examples.

Although embodiments of the present disclosure have been shown and illustrated, it shall be understood by those skilled in the art that the above embodiments are exemplary and cannot be construed to limit the present disclosure; various changes, modifications, alternatives, and variants can be made in the embodiments without departing from the scope of the present disclosure.

What is claimed is:

1. A pet litter scoop assembly, comprising a litter sieve for collecting used litter, wherein, the litter sieve comprises a base part of the litter sieve and a handle of the litter sieve extending from the base part of the litter sieve, the base part comprising a bottom wall and a sidewall extending upwardly from the bottom wall, with a sieving cavity formed by the sidewall and the bottom wall, the handle connected to the sidewall, wherein, the litter sieve comprises holes penetrating the bottom wall and sized such that the used litter cannot pass through the holes, and at least one guiding rib(s) protruding from the bottom wall to the sieving cavity and positioned adjacent to the holes to guide unused litter pellets in the sieving cavity to pass through the holes;

the assembly further comprises a scoop detachably connected to the litter sieve, the scoop comprises a main body configured to receive the base part of the litter sieve, and a hand sleeve part extending from the main body and configured to receive the handle of the litter sieve.

2. The pet litter scoop assembly according to claim 1, wherein, the sidewall is U-shaped, with a notch communicating with the sieving cavity and formed by the sidewall.

3. The pet litter scoop assembly according to claim 2, wherein, an array of the holes are configured on the bottom wall and the guiding rib is at least configured between two adjacent holes.

4. The pet litter scoop assembly according to claim 3, wherein an array of the guiding ribs are configured on the bottom wall, with at least one of the holes provided between two adjacent guiding ribs.

5. The pet litter scoop assembly according to claim 4, wherein, the holes are elongated-shaped and the guiding ribs extends along a longitude direction of the holes.

6. The pet litter scoop assembly according to claim 5, wherein, a row of holes are configured between two adjacent guiding ribs, the guiding rib having a length equal to or less than a row length of the holes.

7. The pet litter scoop assembly according to claim 3, wherein, the holes adjacent to the sidewall of the litter sieve further extend to and penetrate the sidewall of the litter sieve.

8. The pet litter scoop assembly according to claim 2, wherein, the sidewall of the litter sieve comprises a backwall connecting to the bottom wall of the litter sieve and the handle of the litter sieve, and two wing walls separated by and connected to the backwall.

9. The pet litter scoop assembly according to claim 8, wherein, the wing walls have a height decreasing in a direction away from the backwall.

10. The pet litter scoop assembly according to claim 1, wherein, the handle of the litter sieve comprises a through hole at a distal end away from the sidewall of the litter sieve.

11. The pet litter scoop assembly according to claim 1, wherein, the main body comprises a lower wall corresponding to and spaced apart from the bottom wall of the litter sieve, and a surrounding wall extending upwardly from the lower wall and corresponding to the sidewall of the litter sieve, with a receiving space formed by the surrounding wall and the lower wall to receive the base part of the litter sieve.

12. The pet litter scoop assembly according to claim 11, wherein, a distance between the lower wall and the bottom wall increases in a direction away from the handle of the litter sieve.

13. The pet litter scoop assembly according to claim 1, wherein, the hand sleeve part has a U-shaped groove to receive the handle of the litter sieve.

14. The pet litter scoop assembly according to claim 13, wherein, the hand sleeve part comprises at least one protrusion formed in the U-shaped groove to abut against the handle of the litter sieve when the litter sieve is assembled with the scoop.

15. A litter sieve for collecting used litter, comprising a base part of the litter sieve and a handle of the litter sieve extending from the base part of the litter sieve, the base part comprising a bottom wall and a sidewall extending upwardly from the bottom wall, with a sieving cavity formed by the sidewall and the bottom wall, the handle connected to the sidewall, wherein, the litter sieve comprises holes penetrating the bottom wall and sized such that the used litter cannot pass through the holes, and at least one guiding rib(s) protruding from the bottom wall to the sieving cavity and positioned adjacent to the holes to guide unused litter pellets in the sieving cavity to pass through the holes;

the litter sieve further comprises a scoop detachably connected to the litter sieve, the scoop comprises a main body configured to receive the base part of the litter sieve, and a hand sleeve part extending from the main body and configured to receive the handle the handle of the litter sieve.

16. The litter sieve according to claim 15, wherein, the sidewall is U-shaped.

17. The litter sieve according to claim 16, wherein, an array of the holes are configured on the bottom wall and the guiding rib is at least configured between two adjacent holes.

18. The litter sieve according to claim 17, wherein an array of the guiding ribs are configured on the bottom wall, with at least one of the holes provided between two adjacent guiding ribs.

19. The litter sieve according to claim 18, wherein, the holes are elongated-shaped and the guiding ribs extends along a longitude direction of the holes.

* * * * *